W. MOLLER.
ADJUSTABLE STEERING POST FOR AUTOMOBILES.
APPLICATION FILED DEC. 16, 1919.
1,368,959.
Patented Feb. 15, 1921.
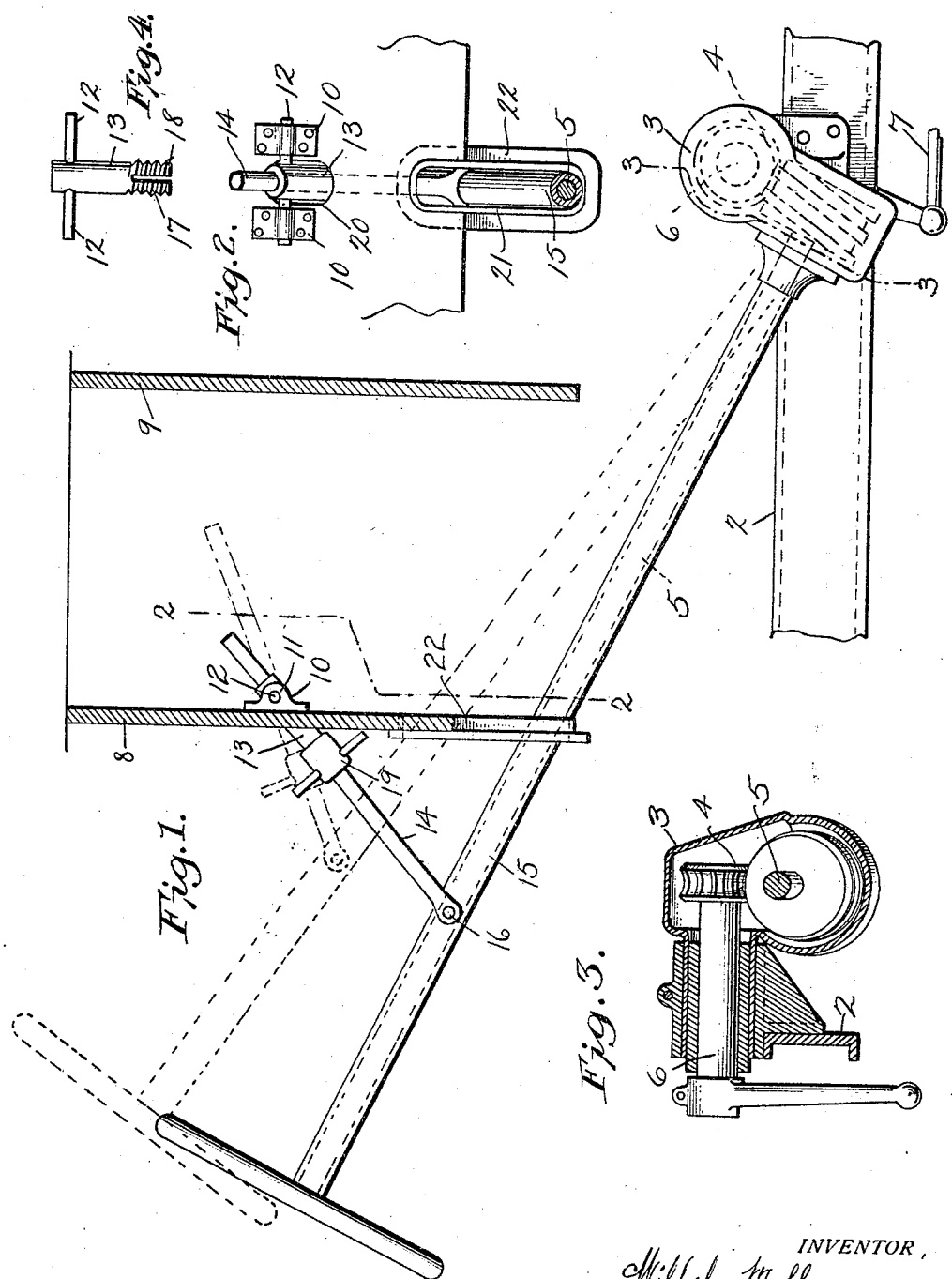
INVENTOR,
Wilhelm Moller
E. W. Anderson & Son
Attorneys

UNITED STATES PATENT OFFICE.

WILHELM MOLLER, OF LEWISTOWN, PENNSYLVANIA, ASSIGNOR TO MOLLER MOTOR COMPANY, OF LEWISTOWN, PENNSYLVANIA, A CORPORATION OF DELAWARE.

ADJUSTABLE STEERING-POST FOR AUTOMOBILES.

1,368,959.    Specification of Letters Patent.    Patented Feb. 15, 1921.

Application filed December 16, 1919. Serial No. 345,371.

*To all whom it may concern:*

Be it known that I, WILHELM MOLLER, a citizen of the United States, resident of Lewistown, in the county of Mifflin and State of Pennsylvania, have made a certain new and useful Invention in Adjustable Steering-Posts for Automobiles, and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention, as applied, the adjusted positions of parts being shown in dotted lines.

Fig. 2 is a section on the line 2—2 Fig. 1.

Fig. 3 is a detail section on the line 3—3 Fig. 1.

Fig. 4 is a detail side view of the split end sleeve.

The invention has relation to the steering columns of automobiles, having for its object to provide a pivotally adjustable steering column, whereby the steering wheel at the upper end of the steering shaft or post, together with said post and said column, may be raised or lowered within certain limits, for convenience of operation or passage of the occupants thereby, and held in position as adjusted.

The invention consists in the novel construction and combinations of parts, as hereinafter set forth.

In the accompanying drawings, illustrating the invention, the numeral 2 designates the frame of the car, whereon is pivotally mounted a housing 3 for the worm gear 4 forming an operating connection between the lower end of the steering post 5 and the cranked shaft 6, the latter mounted concentrically within the sleeved pivotal bearing portion of the housing 3 and operating the steering rod 7. The lower end of the steering column is attached to the housing 3, and tends to move pivotally therewith, about the shaft 6 as a center, upon rotation of said gear.

8 is the instrument board and 9 is the dash board, spaced apart therefrom, brackets 10 being secured to the former and having apertures 11, pivotally engaged by lateral extensions 12 of a sleeve 13, a connecting rod or arm 14 being provided between the steering column 15 and said sleeve and having at its lower forked end pivotal connection with said column at 16, and at its upper end passing loosely through said sleeve beyond said pivotal connection and being adjustable lengthwise in said sleeve. The sleeve 13 is split at 17, at its lower threaded end 18, and a lock nut 19 engages said threaded split portion, being adapted upon engagement thereof in one direction to close the branches of the split end of the sleeve upon the aforesaid connecting rod to hold the latter as adjusted lengthwise of the sleeve, and upon adjustment in the opposite direction to release the sleeve or clamp, the branches of which will spring outwardly to a sufficient extent to admit of lengthwise movement of said rod therein.

The sleeve 13 engages and works in a slot or opening 20 of the instrument board, and the steering column works in a slot 21 of an elongated plate or guide 22, carried by said board.

In use, in order to adjust the steering column, post and wheel as stated, the lock nut is operated or rotated to release the sleeve, when the adjustment may be made, and the lock nut rotated in the opposite direction to close the split ends of the sleeve upon the connecting rod to hold the adjustment, which does not disturb in any way the proper action of the worm gearing 4.

The lock nut is within easy reach of the driver and yet out of the way of his hands and arms when driving, and the adjustment is securely held, the spring action of the split ends of the sleeve acting as a means for preventing or checking loosening of the nut thereon.

I claim:—

In a device of the character described, an automobile frame, a gear casing pivotally mounted thereon, a steering gear mounted in said casing to pivot therewith, a steering column fixed in said casing to pivot therewith, a steering post in said column, an automobile body, and means for locking said column in adjusted position comprising a tubular clamp having pivotal connection with said body, and a member pivoted to said column and passing through said clamp and projecting beyond said pivotal connection.

In testimony whereof I affix my signature in presence of two witnesses.

WILHELM MOLLER.

Witnesses:
IRA J. UTTLEY,
CHAS. W. STAHL.